United States Patent
Hwang et al.

(10) Patent No.: US 8,675,952 B2
(45) Date of Patent: Mar. 18, 2014

(54) APPARATUS AND METHOD TO EXTRACT THREE-DIMENSIONAL (3D) FACIAL EXPRESSION

(75) Inventors: Young Kyoo Hwang, Seoul (KR); Jung Bae Kim, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 474 days.

(21) Appl. No.: 12/805,331

(22) Filed: Jul. 26, 2010

(65) Prior Publication Data

US 2011/0069879 A1    Mar. 24, 2011

(30) Foreign Application Priority Data

Sep. 18, 2009  (KR) .......................... 10-2009-0088501

(51) Int. Cl.
*G06K 9/00* (2006.01)

(52) U.S. Cl.
USPC ........... 382/154; 382/103; 345/473; 345/419; 345/646; 345/441

(58) Field of Classification Search
USPC ........... 382/154, 103; 345/473, 419, 646, 441
See application file for complete search history.

(56) References Cited

U.S. PATENT DOCUMENTS

| | | | |
|---|---|---|---|
| 6,556,196 B1 * | 4/2003 | Blanz et al. | 345/419 |
| 6,580,811 B2 | 6/2003 | Maurer et al. | |
| 2007/0091085 A1 | 4/2007 | Wang et al. | |
| 2008/0273765 A1 | 11/2008 | Tsujimura | |

FOREIGN PATENT DOCUMENTS

| | | |
|---|---|---|
| KR | 10-2008-0050336 | 6/2008 |
| KR | 10-2009-0065965 | 6/2009 |
| KR | 10-2009-0072263 | 7/2009 |

OTHER PUBLICATIONS

Terzopoulos et al: "Analysis and synthesis of facial image sequences using physical and anatomical models", PAMI-IEEE, 1993.*
Soyel et al: "Facial Expression Recognition Using 3D Facial Feature Distances", S-VBH, pp. 831-838, 2007.*

* cited by examiner

*Primary Examiner* — Ruiping Li
(74) *Attorney, Agent, or Firm* — Staas & Halsey LLP

(57) ABSTRACT

Provided is a method and apparatus of extracting a 3D facial expression of a user. When a facial image of the user is received, the 3D facial expression extracting method and apparatus may generate 3D expression information by tracking an expression of the user from the facial image using at least one of shape-based tracking and texture-based tracking, may generate a 3D expression model based on the 3D expression information, and reconstruct the 3D expression model to have a natural facial expression by adding muscle control points to the 3D expression model.

21 Claims, 8 Drawing Sheets

APPARATUS AND METHOD TO EXTRACT THREE-DIMENSIONAL (3D) FACIAL EXPRESSION

CROSS-REFERENCE TO RELATED APPLICATIONS

This application claims the benefit of Korean Patent Application No. 10-2009-0088501, filed on Sep. 18, 2009, in the Korean Intellectual Property Office, the disclosure of which is incorporated herein by reference.

BACKGROUND

1. Field

One or more embodiments relate to a method and apparatus of extracting a three-dimensional (3D) facial expression of a user, and more particularly, to a method and apparatus of extracting a 3D facial expression to reproduce a facial expression of a user on an avatar face of the user in a virtual space.

2. Description of the Related Art

Currently, research on a virtual world is rapidly being developed. Wide selections of applications, including a web service for the virtual world, in which a game utilizing an avatar, are appearing. In particular, an avatar representing a user may be a key factor in all the applications associated with the virtual world. Accordingly, when the user is able to easily control the avatar, the user may be further immersed in the virtual world. Also, an interface device may be utilized so that the avatar may express the user's emotions well. Expressions of the avatar may be controlled by selecting from a predetermined menu. The above scheme is significantly inconvenient and may not reproduce various types of expressions. When a facial expression of the user is easily reproduced on a face of the avatar, it may be possible to enhance the sense of reality in the virtual word. In addition, it may also be actively utilized for a shopping service using the virtual word, a virtual community construction, etc.

SUMMARY

According to an aspect of one or more embodiments, there may be provided a method of extracting a three-dimensional (3D) facial expression, the method including: generating 3D expression information, using a processor, by tracking an expression in a facial image of a user when the facial image of the user is received at the processor, generating a 3D expression model based on the 3D expression information using the processor, and reconstructing the 3D expression model by adding muscle control points of at least one facial area to the generated 3D expression model.

The generating of the 3D expression information may include generating the 3D expression information using at least one of shape-based tracking and texture-based tracking.

The generating of the 3D expression information using the texture-based tracking may include extracting feature points from the facial image, calculating a confidence of each of the extracted feature points, estimating a head motion corresponding to one of the 3D expression information based on the extracted feature points, and calculating a 3D expression parameter corresponding to one of the 3D expression information by comparing the extracted feature points and a neutral 3D facial shape of the user stored in a user database.

The generating of the 3D expression information using the texture-based tracking may include extracting at least one facial area from the facial image, generating a plurality of preliminary 3D expression models using a neutral 3D facial shape of the user stored in a user database, calculating a similarity between the extracted at least one facial area and each of the preliminary 3D expression models, calculating a confidence of a preliminary 3D expression model having a highest similarity to the extracted at least one facial area, and calculating a 3D expression parameter and a head motion corresponding to 3D expression information of the preliminary 3D expression model having the highest similarity to the extracted at least one facial area.

The generating of the 3D expression model based on the 3D expression information may include selecting 3D expression information having a higher confidence between the shape-based tracked 3D expression information and the texture-based tracked 3D expression information, and generating the 3D expression model based on the selected 3D expression information.

The generating of the 3D expression model based on the 3D expression information may include combining the shape-based tracked 3D expression information with the texture-based tracked 3D expression information, and generating the 3D expression model based on the combined 3D expression information.

The combining may include combining the shape-based tracked 3D expression information with the texture-based tracked 3D expression information by applying a weight to be proportional to each corresponding confidence based on each corresponding confidence.

The combining may include combining the shape-based tracked 3D expression information with the texture-based tracked 3D expression information by utilizing a color filter based on each corresponding confidence.

The reconstructing may include calculating link vectors between feature points verified from the 3D expression model and muscle control points of at least one facial area verified from a muscle model database, verifying a stiffness coefficient of each of the calculated link vectors from the muscle model database, calculating a location of each of the verified muscle control points based on the verified feature points, the link vectors, and the stiffness coefficient of each of the link vectors, and reconstructing the 3D expression model by adding the verified muscle control points of the at least one facial area to the 3D expression model.

The muscle model database may store the link vectors between the verified feature points and the verified muscle control points, and the stiffness coefficient of each of the link vectors.

According to another aspect of one or more embodiments, there may be provided an apparatus to extract a 3D facial expression, the apparatus including a 3D expression estimator to generate 3D expression information using a processor by tracking an expression in a facial image of a user when the facial image of the user is received at the processor, a 3D expression model generator to generate a 3D expression model based on the 3D expression information using the processor, and a 3D model expression model reconstruction unit to reconstruct the 3D expression model using the processor by adding muscle control points of at least one facial area to the 3D expression model.

The 3D expression estimator may generate the 3D expression information using at least one of shape-based tracking and texture-based tracking.

When the 3D expression information is generated using the shape-based tracking, the 3D expression estimator may extract feature points from the facial image, calculate a confidence of each of the extracted feature points, estimate a head motion corresponding to one of the 3D expression information based on the extracted feature points, and calculate a 3D expression parameter corresponding to one of the 3D expression information by comparing the extracted feature points and a neutral 3D facial shape of the user stored in a user database.

When the 3D expression information is generated using the texture-based tracking, the 3D expression estimator may extract at least one facial area from the facial image, generate a plurality of preliminary 3D expression models using a neutral 3D facial shape of the user stored in a user database, calculate a similarity between the extracted at least one facial area and each of the preliminary 3D expression models, calculate a confidence of a preliminary 3D expression model having a highest similarity to the extracted at least one facial area, and calculate a 3D expression parameter and a head motion corresponding to 3D expression information of the preliminary 3D expression model having the highest similarity to the extracted at least one facial area.

The 3D expression model generator may select 3D expression information having a higher confidence between the shape-based tracked 3D expression information and the texture-based tracked 3D expression information, and may generate the 3D expression model based on the selected 3D expression information.

The 3D expression model generator may combine the shape-based tracked 3D expression information with the texture-based tracked 3D expression information, and may generate the 3D expression model based on the combined 3D expression information.

The 3D expression model generator may combine the shape-based tracked 3D expression information with the texture-based tracked 3D expression information by applying a weight to be proportional to each corresponding confidence based on each corresponding confidence.

The 3D expression model reconstruction unit may calculate link vectors between feature points verified from the 3D expression model and muscle control points of at least one facial area verified from a muscle model database, verify a stiffness coefficient of each of the link vectors from the muscle model database, calculate a location of each of the verified muscle control points based on the verified feature points, the link vectors, and the stiffness coefficient of each of the link vectors, and reconstruct the 3D expression model by adding the verified muscle control points of the at least one facial area to the 3D expression model.

The muscle model database may store the link vectors between the verified feature points and the verified muscle control points, and the stiffness coefficient of each of the link vectors.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Figure 1:
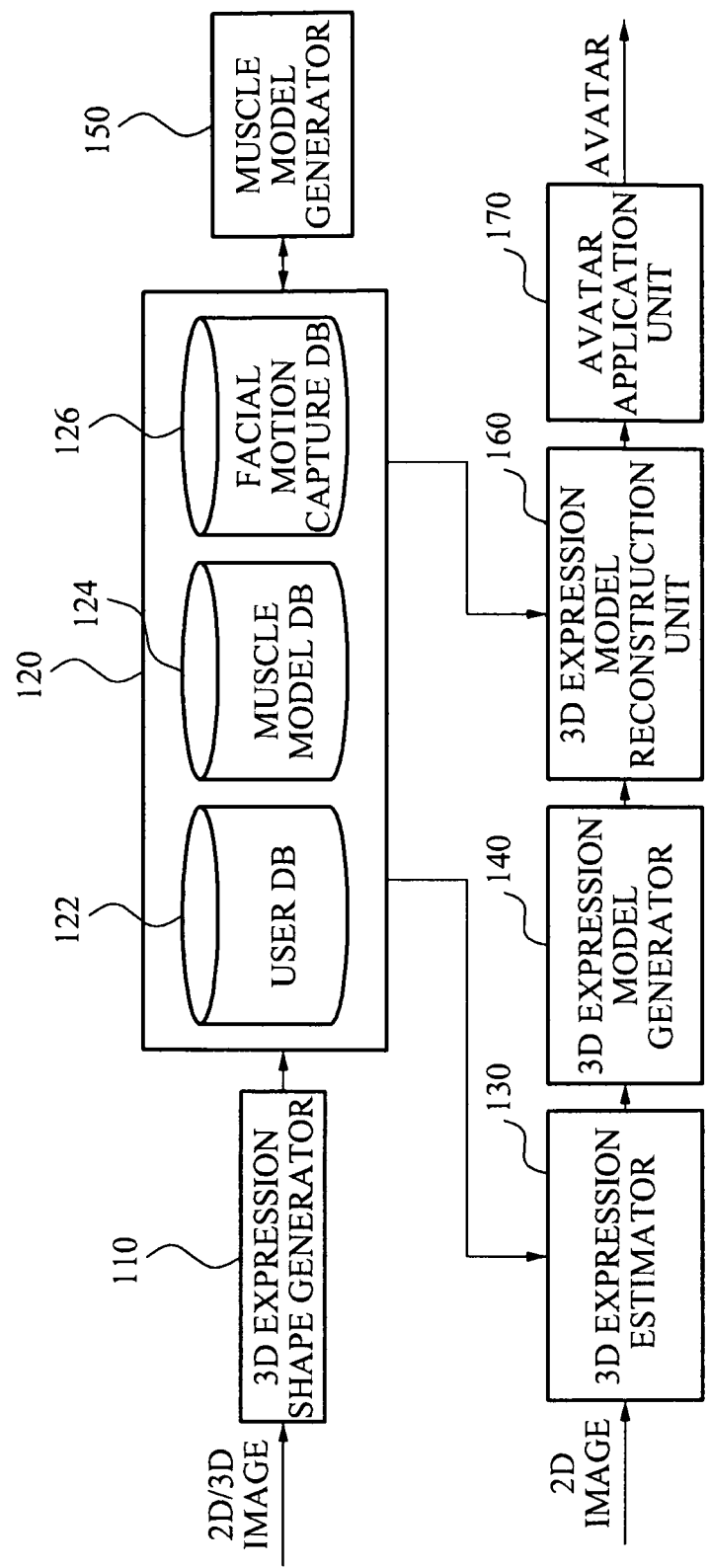
FIG. 1 illustrates an apparatus to extract a three-dimensional (3D) facial expression of a user according to an embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Hereinafter, a method and apparatus of extracting a three-dimensional (3D) facial expression of a user in which a motion of a forehead or a cheek of the user, for example, is reflected according to an embodiment will be described with reference to the accompanying drawings.

FIG. 1 illustrates an apparatus to extract a 3D facial expression of a user according to an embodiment. Referring to FIG. 1, the 3D facial expression extracting apparatus may include a 3D expression shape generator 110, a storage unit 120, a 3D expression estimator 130, a 3D expression model generator 140, a muscle model generator 150, a 3D expression model reconstruction unit 160, and an avatar application unit 170.

The 3D expression shape generator 110 may receive a two-dimensional (2D) image or a 3D image obtained by photographing a user with a neutral expression, and may extract a texture and feature points from the received 2D image or the 3D image, and generate a neutral 3D expression shape based on the feature points. The 3D expression shape generator 110 may store, in a user database 122, the texture, the 3D expression shape, user identification (ID) information, and facial texture information of the user. Here, the 3D face shape denotes a structure of a 3D face generated based on the feature points excluding the texture. The feature point denotes a point that may affect an expression of an eye, an eyebrow, a nose, a lip, an ear, etc. The feature point may be included in a control point to control a facial expression. The control point may include the feature point and a muscle control point. The muscle control point denotes a point that may affect the facial expression, but may not be easily extracted from an image.

The storage unit 120 may include the user database 122, a muscle model database 124, and a facial motion capture database 126. The user database 122 may store a neutral 3D facial model of each user. The neutral 3D facial model denotes a 3D facial model having a neutral expression, and may include user ID information, a texture, and the 3D expression shape generated based on feature points. The muscle model database 124 may store link vectors between muscle control points and feature points, and a stiffness of each of the link vectors. The facial model capture database 126 may store high definition motion capture data associated with facial muscles.

The 3D expression estimator 130 may receive a facial image of the user, track an expression from the facial image, and generate 3D expression information. The expression may be estimated using shape-based tracking and/or texture-based tracking. The 3D expression estimator 130 may generate the 3D expression information using one of the shape-based tracking and the texture-based tracking. The 3D expression estimator may also generate the 3D expression information using both the shape-based tracking and the texture-based tracking. The shape-based tracking will be further described with reference to FIG. 3, and the texture-based tracking will be further described with reference to FIG. 4.

The 3D expression model generator 140 may generate the 3D expression model based on the generated 3D expression information. When the 3D expression model generator 140 receives, from the 3D expression estimator 130, the shape-based tracked 3D expression information and the texture-based tracked 3D expression information, the 3D expression information generator 140 may select one of, or combine, the shape-based tracked 3D expression information and the texture-based tracked 3D expression information. The 3D expression model generator 140 may generate the 3D expression model based on the selected 3D expression information or the combined 3D expression information. A process of generating the 3D expression model by the 3D expression model generator 140 when the shape-based tracked 3D expression information and the texture-based tracked 3D expression information is received will be further described with reference to FIG. 5.

The muscle model generator 150 may store, in the facial motion capture database 126, high definition motion capture data associated with facial muscles using a high definition of motion capture. The muscle model generator 150 may generate a muscle model based on a link vector corresponding to a neutral expression and a stiffness coefficient of the link vector, and may store the generated muscle model in the muscle model database 124. The link vector corresponding to a neutral expression and the stiffness coefficient of the link vector may correspond to general information with respect to a plurality of users, and may also correspond to personal information with respect to each of the users. A process of generating, by the muscle model generator 150, the muscle model will be further described with reference to FIG. 7.

The 3D expression model reconstruction unit 160 may reconstruct the 3D expression model by adding, to the 3D expression model received from the 3D expression model generator 140, muscle control points of a forehead, a cheek, etc. that are verified from the muscle model generator 150.

The avatar application unit 170 may reflect, on an avatar of the user, expressions of the user based on the reconstructed 3D expression model received from the 3D expression model reconstruction unit 160, and may output the avatar.

Hereinafter, a method of extracting a 3D facial expression of a user in which a motion of a forehead, a cheek, etc. of the user is reflected will be described.

Figure 2:
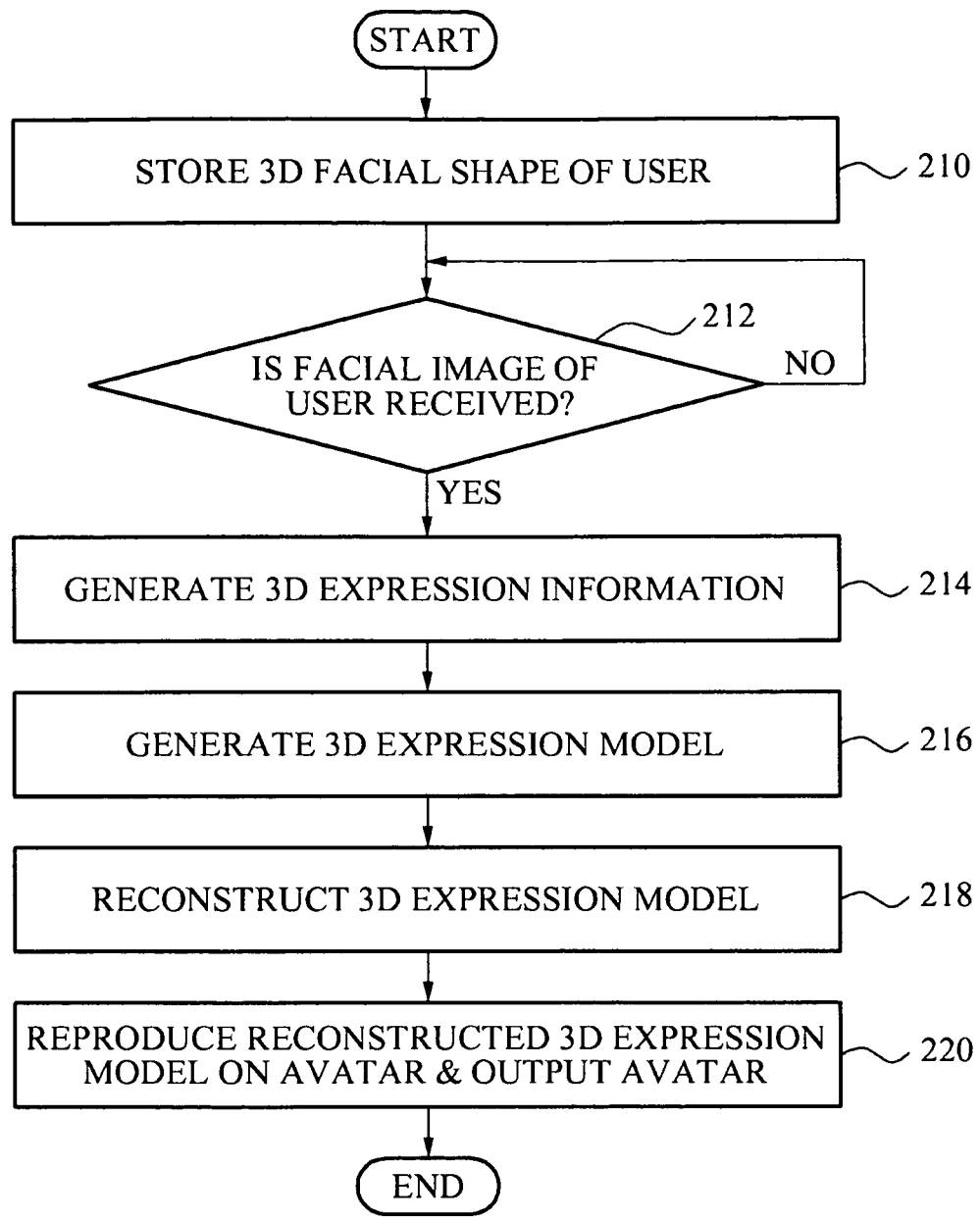
FIG. 2 illustrates a method of extracting a 3D facial expression of a user according to an embodiment.

FIG. 2 illustrates a method of extracting a 3D facial expression of a user according to an embodiment. Referring to FIG. 2, in operation 210, a 3D facial expression extracting apparatus may store a 3D facial shape of the user in the user database 122 of FIG. 1 using a neutral facial expression image of the user.

When a facial image of the user is received in operation 212, the 3D facial expression extracting apparatus may generate 3D expression information by tracking an expression of the received facial image in operation 214. The expression may be estimated using shape-based tracking and/or texture-based tracking. In this example, the 3D expression estimator 130 may generate the 3D expression information using one of the shape-based tracking and the texture-based tracking, and may also generate the 3D expression information using both the shape-based tracking and the texture-based tracking. The shape-based tracking will be further described with reference to FIG. 3, and the texture-based tracking will be further described with reference to FIG. 4.

In operation 216, the 3D facial expression extracting apparatus may generate a 3D expression model based on the 3D expression information. In this example, when shape-based tracked 3D expression information and texture-based tracked 3D expression information are received, the 3D facial expression extracting apparatus may select one of or combine the shape-based tracked 3D expression information and the texture-based tracked 3D expression information. The 3D facial expression extracting apparatus may generate the 3D expression model based on the selected 3D expression information or the combined 3D expression information. A process of generating the 3D expression model when the shape-based tracked 3D expression information and the texture-based tracked 3D expression information are received will be further described with reference to FIG. 5.

In operation 218, the 3D facial expression extracting apparatus may reconstruct a 3D expression model by adding muscle control points of a forehead, a cheek, etc. to the generated 3D expression model. A process of reconstructing the 3D expression model will be further described with reference to FIG. 6.

In operation 220, the 3D facial expression extracting apparatus may reproduce, on an avatar of the user, an expression of the user based on the reconstructed 3D expression model, and may output the avatar.

Figure 3:
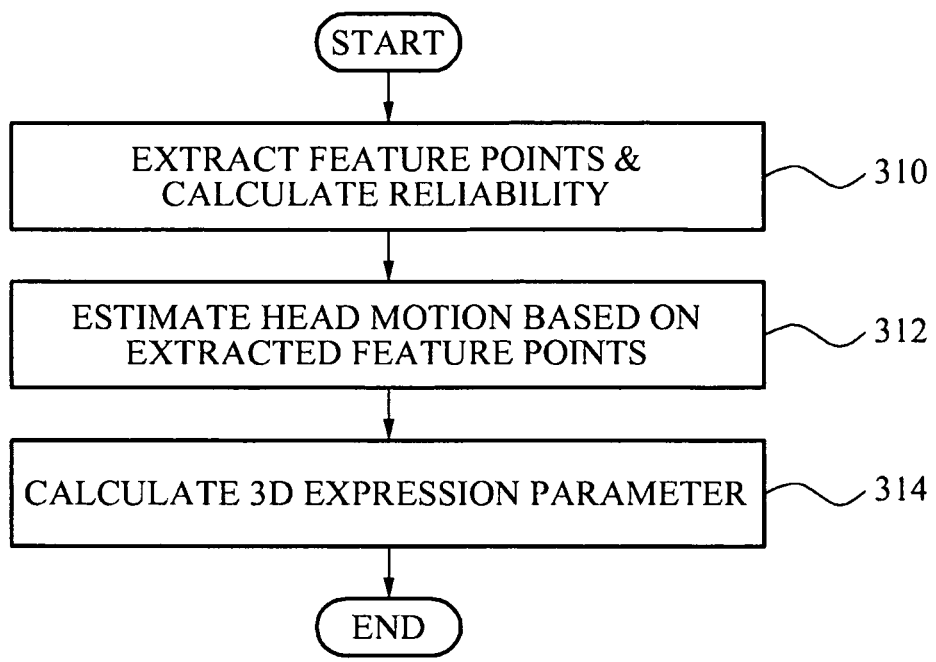
FIG. 3 illustrates a process of obtaining 3D expression information using shape-based tracking according to an embodiment.

FIG. 3 illustrates a process of obtaining 3D expression information using shape-based tracking according to an embodiment. Referring to FIG. 3, in operation 310, the 3D expression estimator 130 may extract feature points from a facial image of a user, and calculate a confidence (reliability) of each of the feature points.

In operation 312, the 3D expression estimator 130 may estimate a head motion of the user based on the extracted feature points. The head motion may include a roll, a pitch, and a yaw of a head.

In operation 314, the 3D expression estimator 130 may calculate a 3D expression parameter based on a comparison between the extracted feature points and a neutral 3D facial shape stored in the user database 122. The 3D expression estimator 130 may calculate the 3D expression parameter according to the following Equation 1:

$$\hat{\tau} = \operatorname*{argmin}_{\tau} \|T_{2D} - R \cdot (\overline{M}_{3D} + \tau \cdot E_{3D}) - t_{2D}\| \Leftrightarrow \quad \text{[Equation 1]}$$

$$\tau = (T_{2D} - R \cdot \overline{M}_{3D} - t_{2D}) \cdot R \cdot E_{3D} \cdot (R \cdot E_{3D} \cdot E_{3D}^T R^T)^{-1}.$$

Here, $\tau$ denotes the 3D expression parameter, $\hat{\tau}$ denotes the calculated 3D expression parameter, $T_{2D}$ denotes a 2D feature point location, R denotes a matrix value obtained by rotating a 3D image based on a 2D image, $\overline{M}_{3D}$ denotes the neutral 3D expression shape of the user, $E_{3D}$ denotes a 3D expression basis that defines a predetermined motion of a 3D feature point moving along an expression of the user, and $t_{2D}$ denotes a 2D transformation.

The 3D expression estimator 130 may output the 3D expression information containing the head motion and the 3D expression parameter, and confidence information associated with the 3D expression information.

Figure 4:
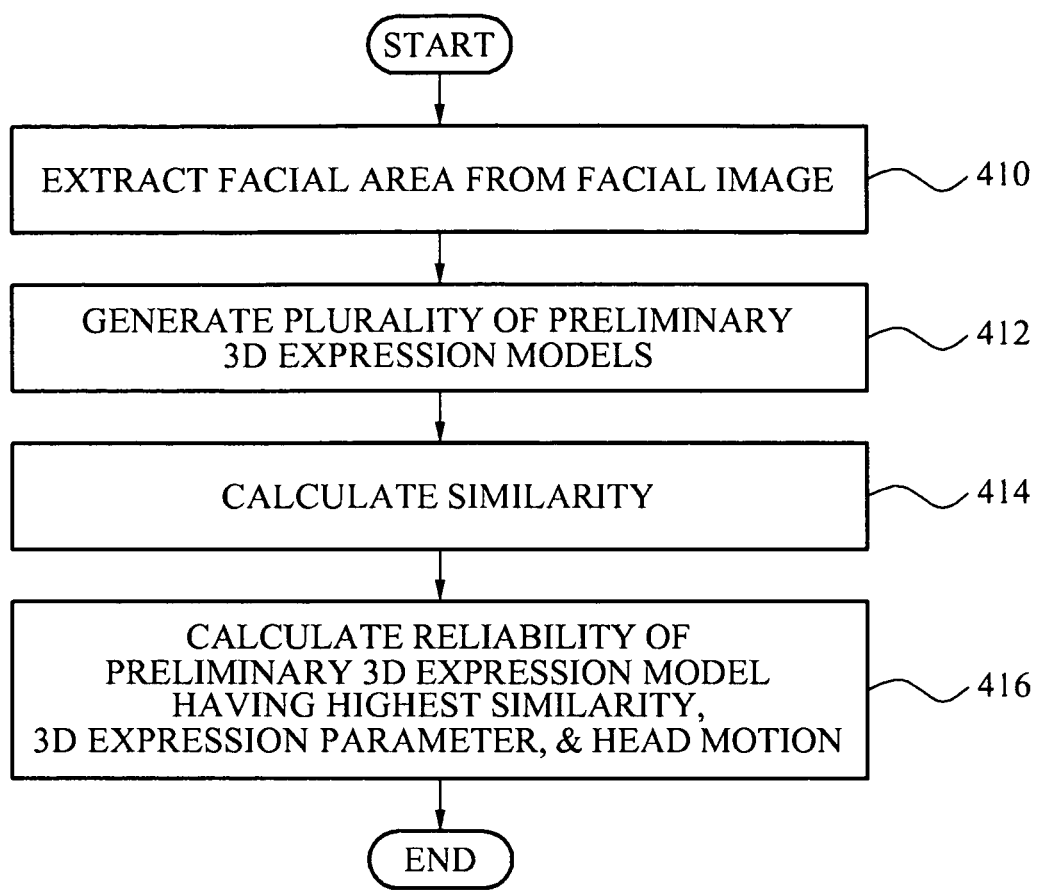
FIG. 4 illustrates a process of obtaining 3D expression information using texture-based tracking according to an embodiment.

FIG. 4 illustrates a process of obtaining 3D expression information using texture-based tracking according to an embodiment. Referring to FIG. 4, in operation 410, the 3D expression estimator 130 may extract a facial area from a facial image of a user.

In operation 412, the 3D expression estimator 130 may generate a plurality of preliminary 3D expression models using the 3D facial shape of the user stored in the user database 122. The preliminary 3D expression models $M_{3D}$ may be generated based on size information S and a change of the 3D expression parameter τ according to the following Equation 2:

$$M_{3D} = SR_{3D} \cdot (\overline{M}_{3D} + \tau \cdot E_{3D}) + t_{2D} \quad \text{[Equation 2]}$$

Here, $M_{3D}$ denotes the 3D expression model, S denotes the size information, τ denotes the 3D expression parameter, $R_{3D}$ denotes rotation information indicating a head motion of the user, $\overline{M}_{3D}$ denotes a neutral 3D expression shape of the user, $E_{3D}$ denotes a 3D expression basis that defines a predetermined motion of a 3D feature point moving along an expression of the user, and $t_{2D}$ denotes a location change vector to the x- or -y-axis in an image.

In operation 414, the 3D expression estimator 130 may calculate a similarity between the facial area and each of the preliminary 3D expression models. Here, a stored texture image of the user may be utilized as a reference image to calculate the similarity. A facial image extracted as an input image may be warped to be the reference image using the 3D expression model of the user. An expression closest to a current expression of the user may be retrieved by comparing the reference image and the warped image. A value of a texture of a corresponding pixel may be utilized as when calculating the similarity, or the similarity may be measured by calculating a correlation coefficient and the like.

In operation 416, the 3D expression estimator 130 may calculate a confidence (reliability) of a preliminary 3D expression model having a highest similarity, the 3D expression parameter, and the head motion of the user.

The 3D expression estimator 130 may output the 3D expression information containing the head motion and the 3D expression parameter, and confidence information associated with the 3D expression information.

Figure 5:
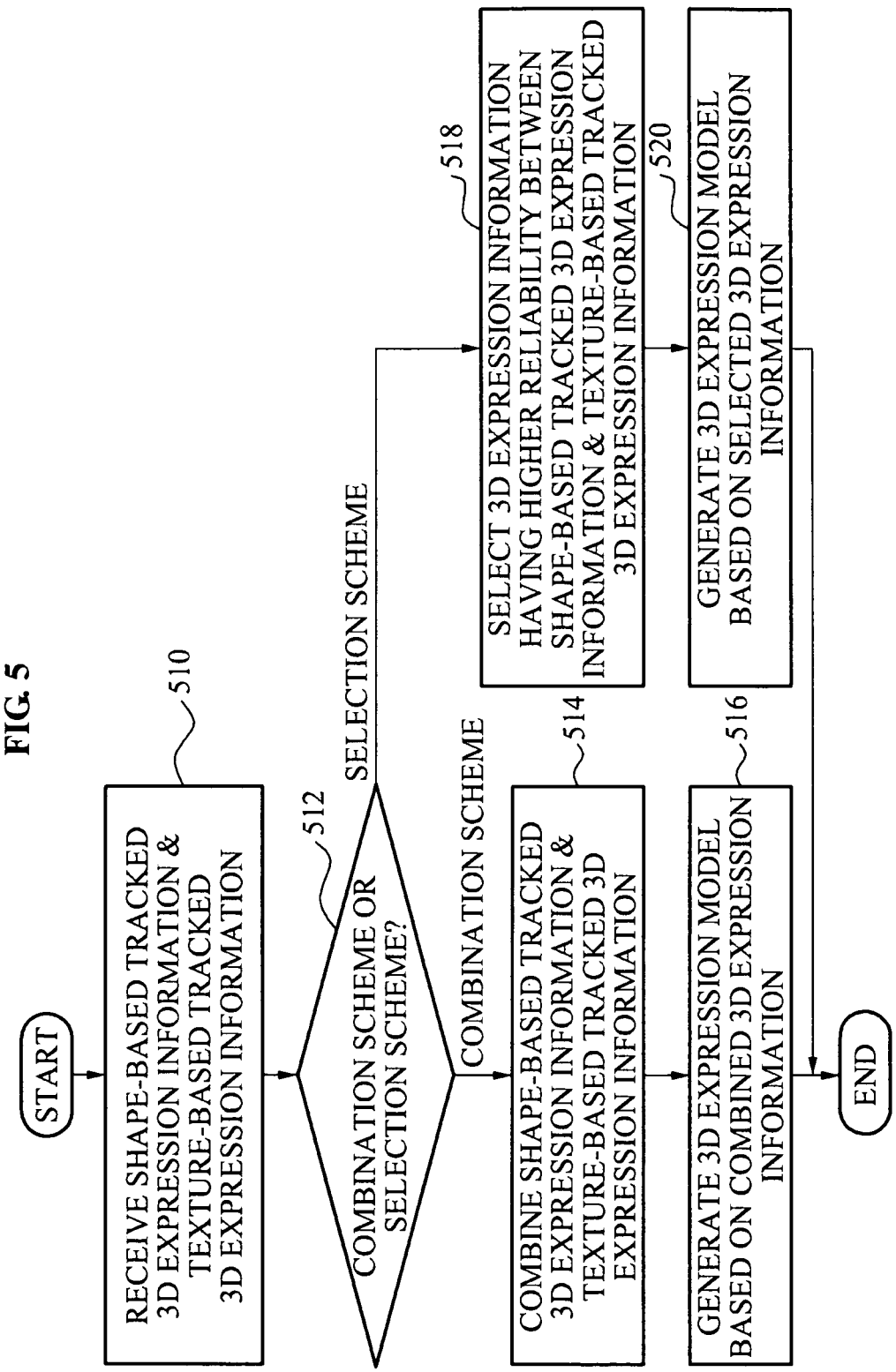
FIG. 5 illustrates a process of generating a 3D expression model according to an embodiment.

FIG. 5 illustrates a process of generating a 3D expression model according to an embodiment.

In operation 510, the 3D expression model generator 140 may receive shape-based tracked 3D expression information and texture-based tracked 3D expression information. Here, the 3D expression model generator 140 may also receive confidence information associated with each corresponding 3D expression information.

In operation 512, the 3D expression model generator 140 may determine whether to process 3D expression information using a combining scheme or a selection scheme.

When it is determined to process the 3D expression information using the combination scheme, the 3D expression model generator 140 may combine the shape-based tracked 3D expression information and the texture-based tracked 3D expression information in operation 514.

Here, combining may be performed using 3D expression information having a relatively high confidence based on a confidence of each 3D expression information.

Also, combining may be performed using a weight combination based on the confidence of each 3D expression information. The weight combination based on the confidence denotes a scheme of performing combining by applying a relatively high weight to relatively more reliable 3D expression information. The weight combination may be performed according to the following Equation 3:

$$X_p = \begin{bmatrix} \theta_p \\ \tau_p \end{bmatrix}, p \in \{s, t, f\} \quad \text{[Equation 3]}$$

$$X_f = \frac{C_s}{C_s + C_t} \cdot X_s + \frac{C_t}{C_s + C_t} \cdot X_t.$$

Here, $X_p$ denotes 3D expression information of p, $\theta_p$ denotes a head motion corresponding to one of the 3D expression information of p, $\tau_p$ denotes a 3D expression parameter corresponding to one of the 3D expression information of p, s denotes the shape-based tracking, t denotes the texture-based tracking, f denotes combined information, $C_s$ denotes a confidence of shape-based tracked 3D expression information, and $C_t$ denotes a confidence of texture-based tracked 3D expression information.

The shape-based tracked 3D expression information and the texture-based tracked 3D expression information may be combined using a color filter based on the confidence of each corresponding 3D expression information. A color filter scheme may be performed according to the following Equation 4:

$$X_{f,0} = \frac{C_{s,0}}{C_{s,0} + C_{t,0}} \cdot X_{s,0} + \frac{C_{t,0}}{C_{s,0} + C_{t,0}} \cdot X_{t,0} \quad \text{[Equation 4]}$$

$$\hat{X}_{f,n} = A \cdot X_{f,n-1}$$

$$\hat{P}_n = A P_{n-1} A^T + Q$$

$$K_n = \hat{P}_n (\hat{P}_n + R)^{-1}$$

$$X_{f,n} = \hat{X}_{f,n} + K_n \begin{bmatrix} X_{s,n} - \hat{X}_{f,n} \\ X_{t,n} - \hat{X}_{f,n} \end{bmatrix}$$

$$P_n = (I - K_n) \hat{P}_n$$

Here, $X_{f,0}$ denotes zero-th combined 3D expression information, $\hat{X}_{f,n}$ denotes n-th combined 3D expression information based on (n−1)-th combined 3D expression information, $C_{s,0}$ denotes a confidence of zero-th shape-based tracked 3D expression information, $C_{t,0}$ denotes a confidence of zero-th texture-based tracked 3D expression information, $X_{f,n}$ denotes n-th combined 3D expression information, $X_{s,n}$ denotes n-th shape-based tracked 3D expression information, $X_{t,n}$ denotes n-th texture-based tracked 3D expression information, A denotes a predetermined system parameter, and Q and R denote predetermined test values.

Finally calculated $X_{f,n}$ and $P_n$ may be utilized as $X_{f,n-1}$ and $P_{n-1}$ of a subsequent frame.

In operation 516, the 3D expression model generator 140 may generate a 3D expression model based on the combined 3D expression information $X_f$.

Conversely, when it is determined to process the 3D expression information using the selection scheme in operation 512, the 3D expression model generator 140 may select 3D expression information having a relatively high confidence between the shape-based tracked 3D expression information and the texture-based tracked 3D expression information in operation 518.

In operation 520, the 3D expression model generator 140 may generate the 3D expression model based on the selected 3D expression information.

The 3D expression model $M_{3D}$ may be generated according to the following Equation 5:

$$M_{3D} = R_{3D} \cdot (\overline{M}_{3D} + \tau \cdot E_{3D}) \quad \text{[Equation 5]}$$

Here, $M_{3D}$ denotes the 3D expression model, $\tau$ denotes the 3D expression parameter, $R_{3D}$ denotes rotation information indicating a head motion of the user, $\overline{M}_{3D}$ denotes a neutral 3D expression shape of the user, and $E_{3D}$ denotes a 3D expression basis that defines a predetermined motion of a 3D feature point moving along an expression of the user.

Figure 6:
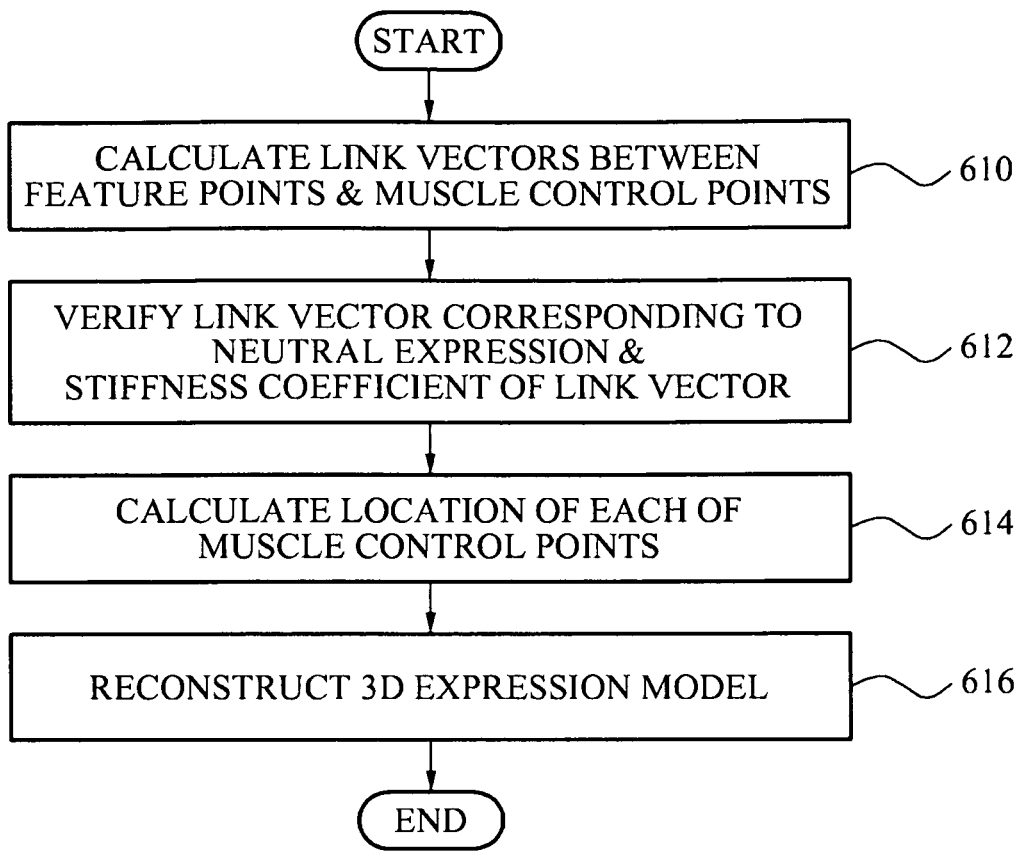
FIG. 6 illustrates a process of reconstructing a 3D expression model according to an embodiment.

FIG. 6 illustrates a process of reconstructing a 3D expression model according to an embodiment. In operation 610, the 3D expression model reconstruction unit 160 may calculate link vectors between feature points, verified from a 3D expression model, and muscle control points, verified from the muscle model database 124.

In operation 612, the 3D expression model reconstruction unit 160 may verify, from the muscle model database 124, a link vector corresponding to a neutral expression and a stiffness coefficient of the link vector.

In operation 614, the 3D expression model reconstruction unit 160 may calculate a location of each of the muscle control points based on the link vectors, the stiffness coefficient of each of the link vectors, and the feature points of the 3D expression model. The location of each of the muscle control points may be calculated according to the following Equation 6:

$$x_n^t \approx \frac{\sum_m k_m \left( x_m^t - \|L_{mn}^0\| \frac{L_{mn}^{t-1}}{\|L_{mn}^{t-1}\|} \right)}{\sum_m k_m} \quad \text{[Equation 6]}$$

Here, m denotes a feature point, n denotes a muscle control point, $x_n^t$ denotes a 3D location of the muscle control point n at a time t, $k_m$ denotes a stiffness coefficient of a link vector between the feature point m and the muscle control point n, $x_m^t$ denotes a 3D location of the feature point m at the time t, $L_{mn}^0$ denotes a link vector between the feature point m and the muscle control point n at a time zero, and $L_{mn}^{t-1}$ denotes a link vector between the feature point m and the muscle control point n at a time t−1.

In operation 616, the 3D expression model reconstruction unit 160 may reconstruct the 3D expression model by adding the muscle control points to the 3D expression model.

Figure 7:
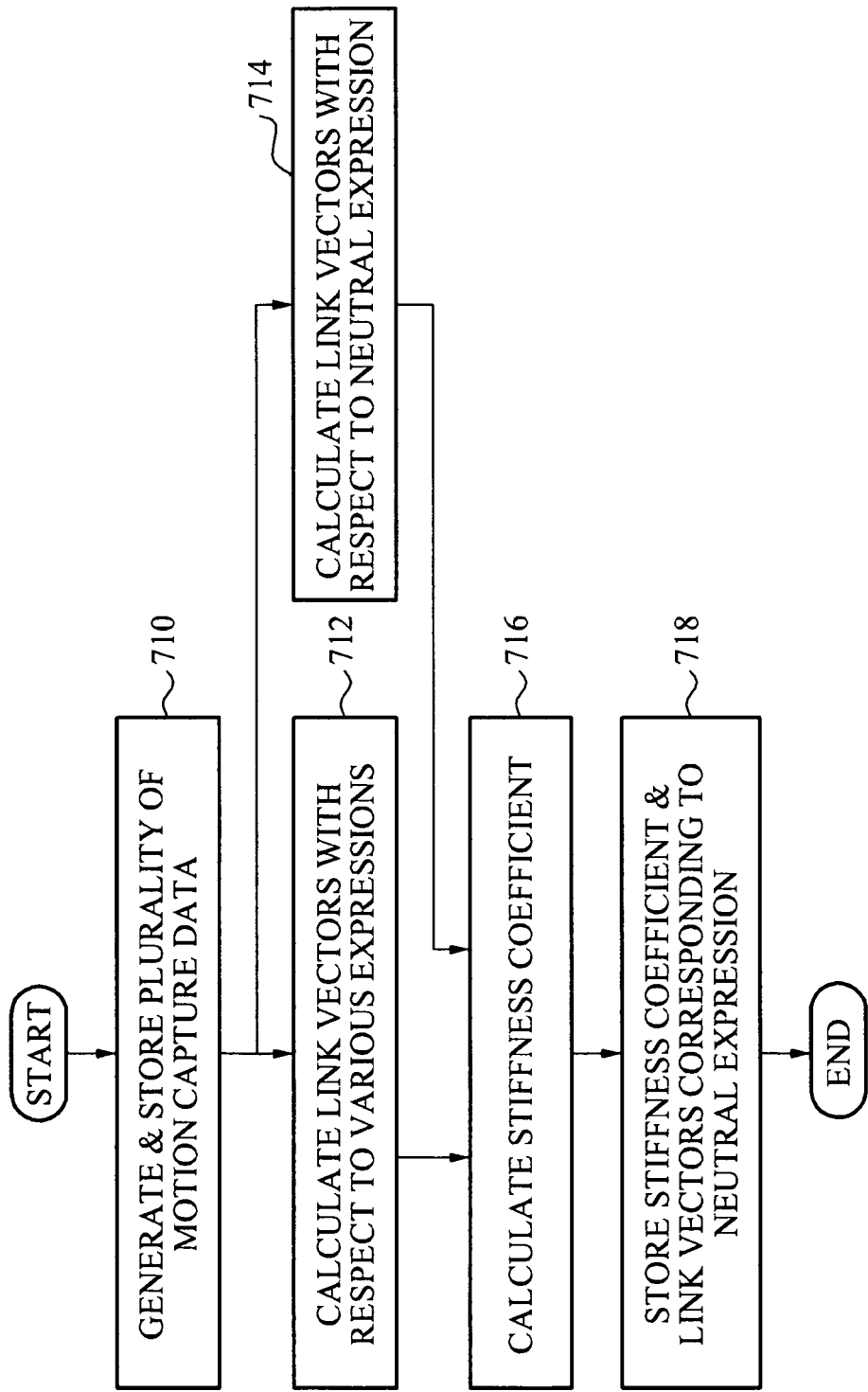
FIG. 7 illustrates a process of constructing a muscle model database according to an embodiment.

FIG. 7 illustrates a process of constructing the muscle model database 124 according to an embodiment.

In operation 710, the muscle model generator 150 may generate a plurality of high definition motion capture data through a high definition of motion capture with respect to each facial muscle, and may store the generated motion capture data in the facial motion capture database 126.

In operation 712, the muscle model generator 150 may calculate link vectors between feature points and muscle control points with respect to various types of expressions.

In operation 714, the muscle model generator 150 may calculate link vectors between feature points and muscle control points corresponding to a neutral expression.

In operation 716, the muscle model generator 150 may calculate a stiffness coefficient of each of the link vectors using the link vectors corresponding to the neutral expression and the link vectors corresponding to various types of expressions.

In operation 718, the muscle model generator 150 may store, in the muscle model database 124, the link vectors corresponding to the neutral expression and the stiffness coefficient of each of the link vectors.

The calculation of the stiffness coefficient will be further described using Equation 7 and Equation 8 below.

Figure 8:
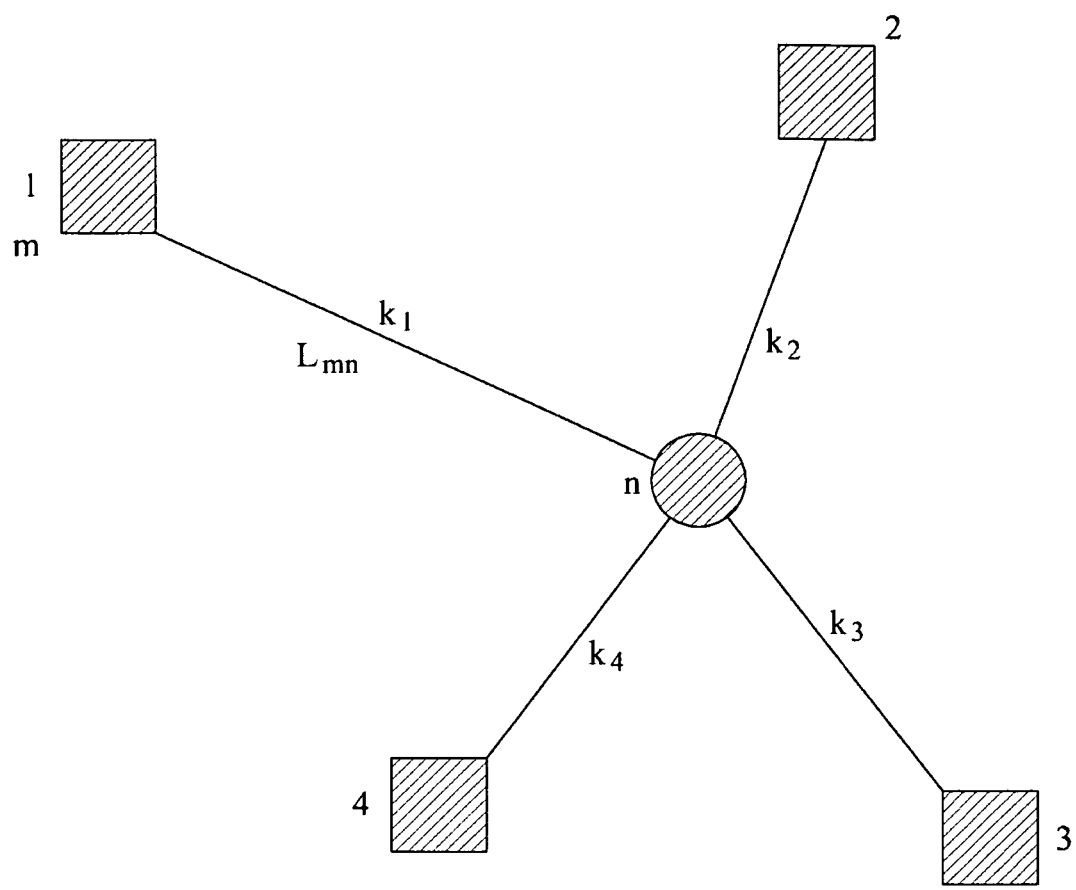
FIG. 8 illustrates a link vector between feature points and a muscle control point, and a stiffness coefficient of the link vector according to an embodiment.

FIG. 8 illustrates a link vector between feature points and a muscle control point, and a stiffness coefficient of the link vector according to an embodiment.

Referring to FIG. 8, a square denotes a feature point expressed as m, and a circle denotes a muscle control point expressed as n $k_m$ denotes a stiffness coefficient of a link vector between the feature point m and the muscle control point n, and $L_{mn}$ denotes the link vector between the feature point m and the muscle control point n.

A correlation relationship between the link vector and the stiffness coefficient as shown in FIG. 8 may be expressed by the follow in a Equation 7:

$$\sum_m k_m \left[ L_{mn}^t - \|L_{mn}^0\| \frac{L_{mn}^t}{\|L_{mn}^t\|} \right] = 0. \quad \text{[Equation 7]}$$

Here, m denotes the feature point, n denotes the muscle control point, $k_m$ denotes the stiffness coefficient of the link vector between the feature point m and the muscle control point n, $L_{mn}^0$ denotes a link vector between the feature point m and the muscle control point n at a time zero, and $L_{mn}^{t-1}$ denotes a link vector between the feature point m and the muscle control point n at a time t−1.

The above Equation 7 may also be expressed by the following Equation 8:

$$L_{mn}^t - \|L_{mn}^0\| \frac{L_{mn}^t}{\|L_{mn}^t\|} = \Delta L_m = [\Delta L_m^x \; \Delta L_m^y \; \Delta L_m^z]^t \quad \text{[Equation 8]}$$

$$k_2 = k_1 \alpha_2, \; k_3 = k_1 \alpha_3, \; k_4 = k_1 \alpha_4$$

$$\begin{bmatrix} \alpha_2 \\ \alpha_3 \\ \alpha_4 \end{bmatrix} = \begin{bmatrix} \Delta L_2^x & \Delta L_3^x & \Delta L_4^x \\ \Delta L_2^y & \Delta L_3^y & \Delta L_4^y \\ \Delta L_2^z & \Delta L_3^z & \Delta L_4^z \end{bmatrix}^{-1} \begin{bmatrix} \Delta L_1^x \\ \Delta L_1^y \\ \Delta L_1^z \end{bmatrix}$$

Here, m denotes the feature point, n denotes the muscle control point, $\Delta L_m$ denotes a change amount of the link vector between the feature point m and the control point n over time, $\Delta L_m^x$ denotes an x-axial change amount of the link vector between the feature point m and the muscle control point n over time, $\Delta L_m^y$ denotes an y-axial change amount of the link vector between the feature point m and the muscle control point n over time, $\Delta L_m^z$ denotes a z-axial change amount of the link vector between the feature point m and the muscle control point n over time, $k_m$ denotes the stiffness coefficient of the link vector between the feature point m and the muscle control point n, $\alpha_2$ denotes a proportional constant with respect to $k_1$ and $k_2$, $\alpha_3$ denotes a proportional constant with respect to $k_1$ and $k_3$, and $\alpha_4$ denotes a proportional constant with respect to $k_1$ and $k_4$.

According to an embodiment, there may be provided a method and apparatus of extracting a 3D facial expression of a user that may employ both shape-based tracking and texture-based tracking to estimate a 3D expression of a user and thus may enhance a stability and a robustness with respect to generated 3D expression information. In addition, a 3D expression model may be reconstructed by verifying, from a muscle model database, locations of muscle control points, and by adding the muscle control points to the 3D expression model. Accordingly, it is possible to reproduce a natural facial expression of the user on an avatar of the user.

One or more of units/hardware described in the application may also be configured to act as one or more software modules in order to perform the operations of the above-described embodiments and may cause a general purpose computer or processor or a particular machine to perform any of the operations discussed above.

Aspects of the present at least one embodiment can also be embodied as computer-readable codes on a computer-readable medium. Also, codes and code segments to accomplish the present at least one embodiment can be easily construed by programmers skilled in the art to which the present invention pertains. The computer-readable medium may be a computer-readable storage medium, which is any data storage device that can store data which can be thereafter read by a computer system or computer code processing apparatus. Examples of the computer-readable storage medium include read-only memory (ROM), random-access memory (RAM), CD-ROMs, magnetic tapes, floppy disks, and optical data storage devices. The computer-readable medium can also be distributed over network-coupled computer systems so that the computer-readable code is stored and executed in a distributed fashion.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. A method of extracting a three-dimensional (3D) facial expression, the method comprising:
    generating a neutral 3D facial shape using an image of a user with a neutral expression;
    generating 3D expression information, using a processor, by tracking an expression in a facial image of the user when the facial image of the user is received at the processor;
    determining whether to process the 3D expression information using a combination scheme or a selection scheme;
    generating a 3D expression model based on the 3D expression information using the processor and the determined processing scheme; and
    reconstructing the expression model using the processor by adding muscle control points of at least one facial area to the generated 3D expression model,
    wherein the 3D expression information is generated using the neutral 3D facial shape and a plurality of preliminary 3D expression models.

2. The method of claim 1, wherein the generating of the 3D expression information comprises at least one of:
    generating the 3D expression information using shape-based tracking; and
    generating the 3D expression information using texture-based tracking.

3. The method of claim 2, wherein the generating of the 3D expression information using the texture-based tracking comprises:
    extracting feature points from the facial image;
    calculating a confidence of each of the extracted feature points;
    estimating a head motion corresponding to one of the 3D expression information based on the extracted feature points; and
    calculating a 3D expression parameter corresponding to one of the 3D expression information by comparing the feature points and the neutral 3D facial shape.

4. The method of claim 2, wherein the generating of the 3D expression information using the texture-based tracking comprises:
    extracting at least one facial area from the facial image;
    generating the plurality of preliminary 3D expression models using the neutral 3D facial shape of the user stored in a user database;
    calculating a similarity between the at least one extracted facial area and each of the preliminary 3D expression models;
    calculating a confidence of a preliminary 3D expression model having a highest similarity to the at least one extracted facial area; and
    calculating a 3D expression parameter and a head motion corresponding to 3D expression information of the preliminary 3D expression model having the highest similarity to the at least one extracted facial area.

5. The method of claim 2, wherein the generating of the 3D expression model based on the 3D expression information comprises:
    selecting 3D expression information having a higher confidence between the shape-based tracked 3D expression information and the texture-based tracked 3D expression information; and
    generating the 3D expression model based on the selected 3D expression information.

6. The method of claim 2, wherein the generating of the 3D expression model based on the 3D expression information comprises:
    combining the shape-based tracked 3D expression information with the texture-based tracked 3D expression information; and
    generating the 3D expression model based on the combined 3D expression information.

7. The method of claim 6, wherein the combining comprises combining the shape-based tracked 3D expression information with the texture-based tracked 3D expression information by applying a weight to be proportional to each corresponding confidence based on each corresponding confidence.

8. The method of claim 1, wherein the reconstructing comprises:
    calculating link vectors between feature points verified from the 3D expression model and muscle control points of at least one facial area verified from a muscle model database;
    verifying a stiffness coefficient of each of the link vectors from the muscle model database;
    calculating a location of each of the verified muscle control points based on the verified feature points, the link vectors, and the stiffness coefficient of each of the link vectors; and
    reconstructing the 3D expression model by adding the verified muscle control points of the at least one facial area to the 3D expression model.

9. The method of claim 8, wherein the muscle model database stores the link vectors between the verified feature points and the verified muscle control points, and the stiffness coefficient of each of the link vectors.

10. An apparatus to extract a three-dimensional (3D) facial expression, the apparatus comprising:
    a 3D shape generator to generate a neutral 3D facial shape using an image of a user with a neutral expression;
    a 3D expression estimator to generate 3D expression information using a processor by tracking an expression in a facial image of the user when the facial image of the user is received by the processor;

a 3D expression model generator to determine whether to process the 3D expression information using a combination scheme or a selection scheme and generate a 3D expression model based on the 3D expression information using the processor and the determined processing scheme; and a 3D model expression model reconstruction unit to reconstruct the 3D expression model using the processor by adding muscle control points of at least one facial area to the generated 3D expression model, wherein the 3D expression information is generated using the neutral 3D facial shape and a plurality of preliminary 3D expression models.

11. The apparatus of claim 10, wherein the 3D expression estimator generates the 3D expression information using at least one of shape-based tracking, and texture-based tracking.

12. The apparatus of claim 11, wherein the 3D expression estimator extracts feature points from the facial image, calculates a confidence of each of the extracted feature points, estimates a head motion corresponding to one of the 3D expression information based on the extracted feature points, and calculates a 3D expression parameter corresponding to one of the 3D expression information by comparing the extracted feature points and the neutral 3D facial shape, when the 3D expression information is generated using the shape-based tracking.

13. The apparatus of claim 11, wherein the 3D expression estimator extracts at least one facial area from the facial image, generates the plurality of preliminary 3D expression models using the neutral 3D facial shape of the user stored in a user database, calculates a similarity between the extracted at least one facial area and each of the preliminary 3D expression models, calculates a confidence of a preliminary 3D expression model having a highest similarity to the extracted at least one facial area, and calculates a 3D expression parameter and a head motion corresponding to 3D expression information of the preliminary 3D expression model having the highest similarity to the extracted at least one facial area, when the 3D expression information is generated using the texture-based tracking.

14. The apparatus of claim 11, wherein the 3D expression model generator selects 3D expression information having a higher confidence between the shape-based tracked 3D expression information and the texture-based tracked 3D expression information, and generates the 3D expression model based on the selected 3D expression information.

15. The apparatus of claim 11, wherein the 3D expression model generator combines the shape-based tracked 3D expression information with the texture-based tracked 3D expression information, and generates the 3D expression model based on the combined 3D expression information.

16. The apparatus of claim 15, wherein the 3D expression model generator combines the shape-based tracked 3D expression information with the texture-based tracked 3D expression information by applying a weight to be proportional to each corresponding confidence based on each corresponding confidence.

17. The apparatus of claim 15, wherein the 3D expression model generator combines the shape-based tracked 3D expression information with the texture-based tracked 3D expression information by utilizing a color filter based on each corresponding confidence.

18. The apparatus of claim 10, wherein the 3D expression model reconstruction unit calculates link vectors between feature points verified from the 3D expression model and muscle control points of at least one facial area verified from a muscle model database, verifies a stiffness coefficient of each of the link vectors from the muscle model database, calculates a location of each of the verified muscle control points based on the verified feature points, the link vectors, and the stiffness coefficient of each of the link vectors, and reconstructs the 3D expression model by adding the verified muscle control points of the at least one facial area to the 3D expression model.

19. The apparatus of claim 18, wherein the muscle model database stores the link vectors between the verified feature points and the verified muscle control points, and the stiffness coefficient of each of the link vectors.

20. The method of claim 1, wherein the plurality of preliminary 3D expression models are generated based on a rotation information indicating a head motion of the user, a neutral 3D expression shape of the user, a 3D expression basis that defines a predetermined motion of a 3D feature point moving along an expression of the user, and a location change vector to the x- or -y-axis in the facial image of the user.

21. The apparatus of claim 10, wherein the plurality of preliminary 3D expression models are generated based on a rotation information indicating a head motion of the user, a neutral 3D expression shape of the user, a 3D expression basis that defines a predetermined motion of a 3D feature point moving along an expression of the user, and a location change vector to the x- or -y-axis in the facial image of the user.

* * * * *